United States Patent
Zhang et al.

(10) Patent No.: US 11,450,027 B2
(45) Date of Patent: Sep. 20, 2022

(54) METHOD AND ELECTRONIC DEVICE FOR PROCESSING VIDEOS

(71) Applicant: BEIJING DAJIA INTERNET INFORMATION TECHNOLOGY CO., LTD., Beijing (CN)

(72) Inventors: Lei Zhang, Beijing (CN); Qiang Li, Beijing (CN)

(73) Assignee: Beijing Dajia Internet Information Technologys Co., Ltd., Beijing (CN)

( * ) Notice: Subject to any disclaimer, the term of this patent is extended or adjusted under 35 U.S.C. 154(b) by 0 days.

(21) Appl. No.: 17/085,912

(22) Filed: Oct. 30, 2020

(65) Prior Publication Data
US 2021/0134009 A1    May 6, 2021

(30) Foreign Application Priority Data
Oct. 31, 2019   (CN) .......................... 201911049133.7

(51) Int. Cl.
*G06T 7/73*    (2017.01)
*G06V 20/40*   (2022.01)
*G06V 40/16*   (2022.01)

(52) U.S. Cl.
CPC ............... *G06T 7/74* (2017.01); *G06V 20/41* (2022.01); *G06V 40/166* (2022.01); *G06V 40/172* (2022.01); *G06T 2207/30196* (2013.01); *G06V 20/44* (2022.01)

(58) Field of Classification Search
None
See application file for complete search history.

(56) References Cited

U.S. PATENT DOCUMENTS

| | | | |
|---|---|---|---|
| 2015/0326925 A1* | 11/2015 | Ozkan | H04N 21/4722 725/36 |
| 2016/0019426 A1* | 1/2016 | Tusch | G06V 20/47 386/286 |
| 2017/0132469 A1* | 5/2017 | Yiu | G06V 20/40 |
| 2017/0337429 A1* | 11/2017 | Ljungberg | G06V 20/47 |
| 2019/0130594 A1 | 5/2019 | Seyfi et al. | |
| 2020/0020089 A1* | 1/2020 | Cheng | G06V 40/164 |
| 2020/0111267 A1* | 4/2020 | Stauber | G06F 3/017 |

FOREIGN PATENT DOCUMENTS

| | | |
|---|---|---|
| CN | 102254336 A | 11/2011 |
| CN | 104796781 A | 7/2015 |
| CN | 105787976 A | 7/2016 |

(Continued)

OTHER PUBLICATIONS

First office action of Chinese application No. 201911049133.7 dated Nov. 1, 2021 (32 pages).

(Continued)

*Primary Examiner* — Delomia L Gilliard
(74) *Attorney, Agent, or Firm* — Knobbe, Martens, Olson & Bear, LLP

(57) ABSTRACT

The present disclosure relates to a video processing method, and relates to the technical field of multimedia. The method can include: acquiring a source image from a source video, and obtaining a first object by recognizing the source image; adding an object identifier of the first object to the source image; and generating a target video based on the source image with a same object identifier.

20 Claims, 4 Drawing Sheets

---

Acquiring, by an electronic device, at least one source image from the source video, obtaining an object by recognizing each source image, and determining at least one first object included in the source image, the object recognition including at least one of face recognition or body recognition  ⟋ 201

For any one of the at least one first object, adding, by the electronic device, a first object identifier of the first object to the source image  ⟋ 202

Synthesizing, by the electronic device, the video images with a same object identifier into a target video  ⟋ 203

(56) References Cited

FOREIGN PATENT DOCUMENTS

| | | | |
|---|---|---|---|
| CN | 107480658 A | 12/2017 | |
| CN | 108229420 A | 6/2018 | |
| CN | 108881813 A | 11/2018 | |
| CN | 108966017 A | 12/2018 | |
| CN | 109034102 A | 12/2018 | |
| CN | 109118562 A | 1/2019 | |
| CN | 109522843 A | 3/2019 | |
| CN | 109740516 A | 5/2019 | |
| CN | 109800685 A | 5/2019 | |
| CN | 109922373 A | 6/2019 | |
| CN | 110348362 A | 10/2019 | |
| WO | WO-2020199480 A1 * | 10/2020 | ......... G06K 9/00335 |

OTHER PUBLICATIONS

China National Intellectual Property Administration, Second office action of Chinese application No. 201911049133.7 dated May 5, 2022.

* cited by examiner

METHOD AND ELECTRONIC DEVICE FOR PROCESSING VIDEOS

This application is based on and claims priority under 35 U.S.C. 119 to Chinese Patent application No. 201911049133.7, filed on Oct. 31, 2019 and entitled "METHOD FOR PROCESSING VIDEOS, ELECTRONIC DEVICE AND STORAGE MEDIUM", the disclosure of which is incorporated herein by reference in its entirety.

TECHNICAL FIELD

The present disclosure relates to the technical field of multimedia, and more particularly to a method for processing videos, an electronic device, and a storage medium.

BACKGROUND

With the development of multimedia technology, users can shoot and share videos anytime anywhere. In order to enable the shared videos to attract more people to watch, the videos are usually subjected to certain processing. Video editing is a common video processing method. The users usually use a video editing program to process the video, manually extract video images from the video, and then stitch the extracted video images to generate a new video. The users may also add elements such as pictures, background music, special effects, and scenarios to the generated video by the video editing program to improve the expressiveness of the generated video.

SUMMARY

The present disclosure provides a method for processing video, an electronic device and a storage medium.

According to one aspect of embodiments of the present disclosure, a method for processing videos is provided. The method includes: acquiring at least one source image from a source video; obtaining at least one first object by recognizing the source image, wherein the first object includes at least one of a face area or a body area; adding an object identifier of the first object to the source image; and generating a target video based on the source images with a same object identifier.

According to another aspect of the embodiments of the present disclosure, an electronic device is provided. The electronic device includes: a processor; and a memory for storing instructions executable by the processor; wherein the processor is configured to execute the instructions to perform the following operations: acquiring at least one source image from a source video; obtaining at least one first object by recognizing the source image, wherein the first object includes at least one of a face area or a body area; adding an object identifier of the first object to the source image; and generating a target video based on the source images with a same object identifier.

According to yet another aspect of the embodiments of the present disclosure, a storage medium is provided. When instructions in the storage medium are executable by a processor of an electronic device, the processor of the electronic device is capable of executing the following operations: acquiring at least one source image from a source video; obtaining at least one first object by recognizing the source image, wherein the first object includes at least one of a face area or a body area; adding an object identifier of the first object to the source image; and generating a target video based on the source images with a same object identifier.

According to still another aspect of the embodiments of the present disclosure, a computer program product is provided. When instructions in the computer program product are executable by a processor of an electronic device, the electronic device is capable of executing the above method for processing video.

It should be understood that both the foregoing general description and the following detailed description provide examples and are explanatory only and are not intended to limit the present disclosure.

BRIEF DESCRIPTION OF THE DRAWINGS

The accompanying drawings, which are incorporated in and constitute a part of the description, illustrate embodiments of the present disclosure and, together with the description thereof, serve to explain the principles of the present disclosure.

DETAILED DESCRIPTION

Figure 1:
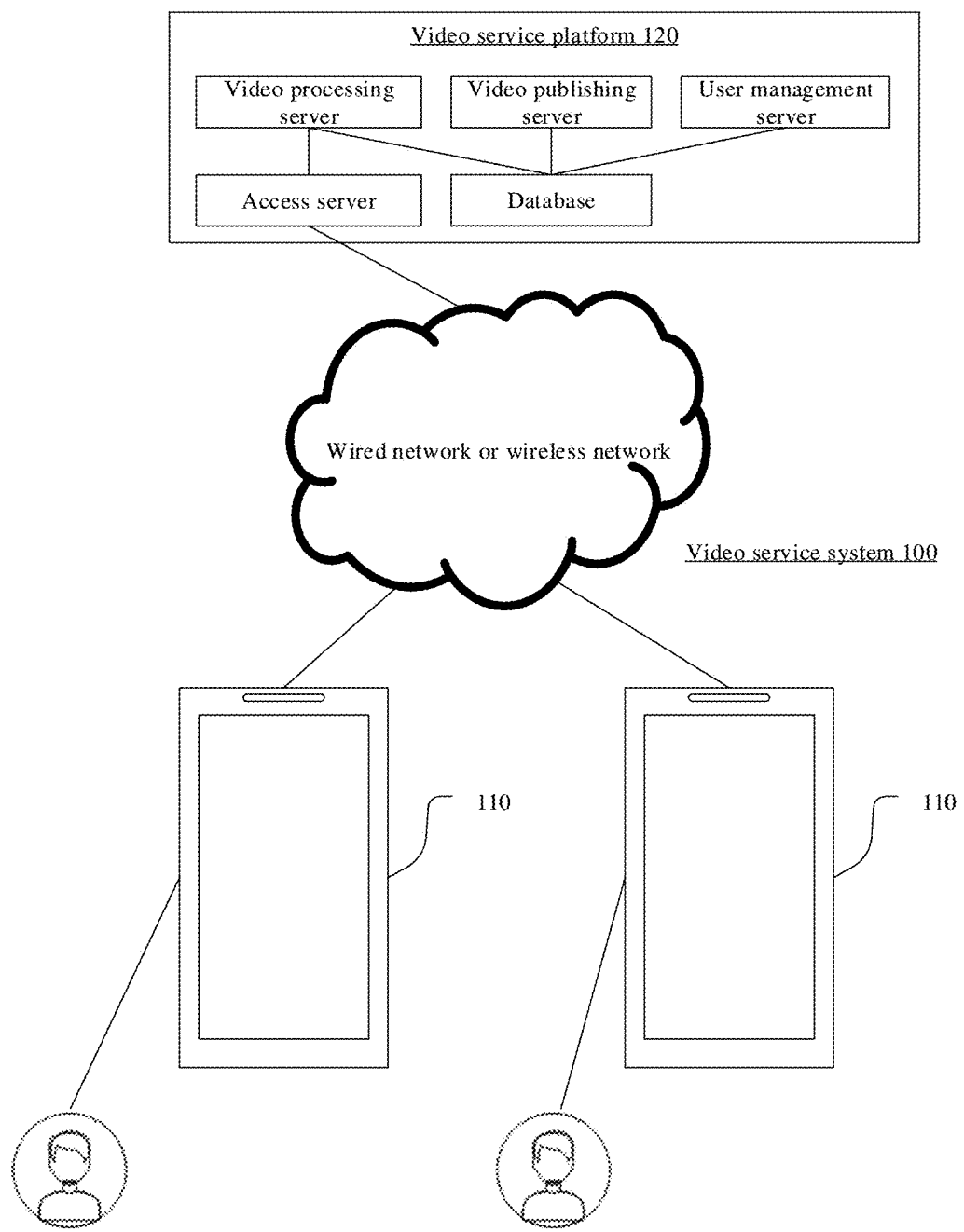
FIG. 1 is a block diagram of a video service system according to an embodiment of the present disclosure.

For those skilled in the art to better understand the technical solution of the present disclosure, the technical solutions in the embodiments of the present disclosure will be clearly and completely described in the following with reference to the accompanying drawings.

It should be noted that the terms "first" and "second" in the description and claims of the present disclosure and the above accompanying drawings are configured to distinguish similar objects, and not necessarily configured to describe a specific order or sequence. It should be understood that the data used in this way can be interchanged under appropriate circumstances, such that the embodiments of the present disclosure described herein can be implemented in a sequence other than those illustrated or described herein. The implementation manners set forth in the following description of example embodiments do not represent all implementation manners consistent with the present disclosure. Rather, they are merely examples of apparatuses and methods consistent with aspects related to the present disclosure as recited in the appended claims.

The application scenario of some embodiments according to the present disclosure is a video processing scenario, and mainly involves the scenario where the video is edited. For example, the user wants to separate video images containing a certain person from a multi-person video, and combine the separated video images into a new video.

A video processing method according to the embodiment of the present disclosure may be applied to the above scenario. When using the video processing method according to the embodiment of the present disclosure to edit video, the user may provide an image including a target object or may not provide an image including the target object. When the user provides the image including the target object, the video processing method according to the embodiment of the present disclosure may extract the video images including the target object from a source video (the video images include the source images), and then synthesize the target video. When the user does not provide the image including the target object, the video processing method according to the embodiment of the present disclosure may generate a plurality of target videos according to a plurality of objects included in the source video, and each of the plurality of the target videos corresponds to one object.

In some embodiments, as regards the face recognition technology, the human face recognition technology is taken as an example, and the human face recognition technology refers to a biological recognition technology that performs identity recognition based on face feature information of a person.

It should be noted that the face recognition technology according to the embodiment of the present disclosure is not limited to the above human face recognition technology. For example, the face recognition technology also includes cat face recognition, dog face recognition, or avatar face recognition, or the like. The type of the face recognition technology is not specifically limited by the embodiment of the present disclosure.

In some embodiments, as regards the body recognition technology, the human body recognition technology is taken as an example. The human body recognition technology refers to a biometric recognition technology that performs identity recognition based on human body feature information.

It should be noted that the body recognition technology according to the embodiment of the present disclosure is not limited to the above human body recognition technology. For example, the body recognition technology also includes animal body recognition, avatar body recognition, robot body recognition, or the like. The type of the body recognition technology is not specifically limited by the embodiment of the present disclosure.

In some embodiments, the target tracking technology is to predict the size and location of a target in subsequent video images under the condition of giving the size and location of the target in a certain video image. Optionally, the tracked target may be one or more human faces, one or more human bodies, or the like. The type of the target is not specifically limited by the embodiment of the present disclosure.

FIG. 1 is a block diagram of a video service system 100 according to an embodiment of the present disclosure. The video service system 100 may be configured for processing a video and includes an electronic device 110 and a video service platform 120.

The electronic device 110 may be connected to the video service platform 120 by a wireless network or a wired network. The electronic device 110 may be at least one of a smart phone, a video camera, a desktop computer, a tablet computer, an MP4 player, or a laptop portable computer. An application program supporting video processing is installed and operated on the electronic device 110. Illustratively, the electronic device 110 may be an electronic device used by the user, and an account number of the user is logged in the application program operated by the electronic device.

The video service platform 120 includes at least one of a server, a plurality of servers, or a cloud computing platform. The video service platform 120 is configured to provide background services of a client side, such as video processing, video publishing and account number association. Optionally, the video server 120 is responsible for the main video processing work, and the electronic device 110 is responsible for the secondary video processing work. Or the video server 120 is responsible for the secondary video processing work, and the electronic device 110 is responsible for the main video processing work. Or the video server 120 and the electronic device 110 are respectively responsible for the video processing work separately.

In some embodiments, the video service platform 120 includes: an access server, a video processing server, a video publishing server, a user management server, and a database. The access server is configured to provide an access service of the electronic device 110. The video processing server is configured to process an uploaded video. There may be one or more video processing servers. When a plurality of video processing servers is provided, there are at least two video processing servers for providing different services, and/or there are at least two video processing servers for providing the same service. For example, the same service is provided in a load balancing manner or the same service is provided in a manner of a main server and a mirror server, which is not limited by the embodiment of the present disclosure. The database is configured to store the uploaded video.

In some embodiments, the electronic device 110 generally refers to one of a plurality of electronic devices, and the present embodiment only uses the electronic device 110 as an example for illustration. Those skilled in the art may know that the number of the above electronic devices may be more or less. For example, there may be only one electronic device, or there may be dozens or hundreds of electronic devices, or more. At this point, the above video service system may also include other electronic devices. The embodiment of the present disclosure does not limit the number and types of the electronic devices.

Figure 2:
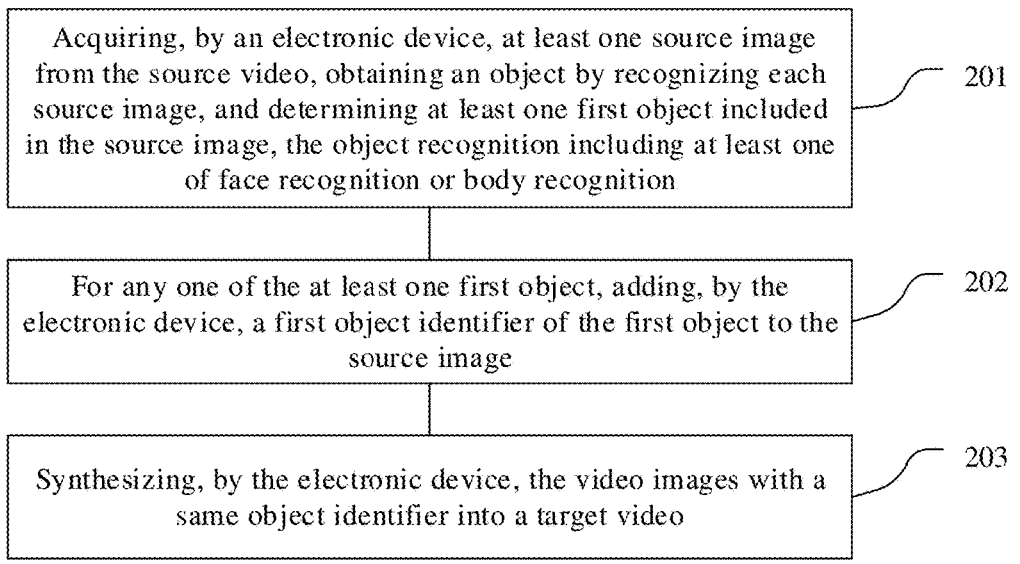
FIG. 2 is a flowchart of a method for processing video according to an embodiment of the present disclosure.

FIG. 2 is a flowchart of a video processing method according to an embodiment of the present disclosure. As shown in FIG. 2, the method includes the following contents.

In 201, the electronic device acquires at least one source image from the source video, performs object recognition on each source image, and determines at least one first object included in the source image. The object recognition includes at least one of face recognition or body recognition.

In some embodiments, the electronic device acquires at least one source image from the source video, and obtains at least one first object by recognizing the source image, wherein the first object includes at least one of a face area or a body area.

In 202, for any one of the at least one first object, the electronic device adds a first object identifier of the first object to the source image.

Since the first object identifier is essentially an object identifier, the above 202 means that the electronic device adds the object identifier of the first object to the source image for any one of the at least first object.

In 203, the electronic device synthesizes the video images with a same object identifier into a target video.

Since the source image may be part or all of the video images, in other words, 203 is a possible implementation in which the electronic device generates the target video based on the source images with the same image identifier.

The technical solution provided by the present disclosure can automatically re-synthesize the video images in the source video into a separate video according to different objects, and the accuracy and efficiency of video processing are high.

Figure 3:
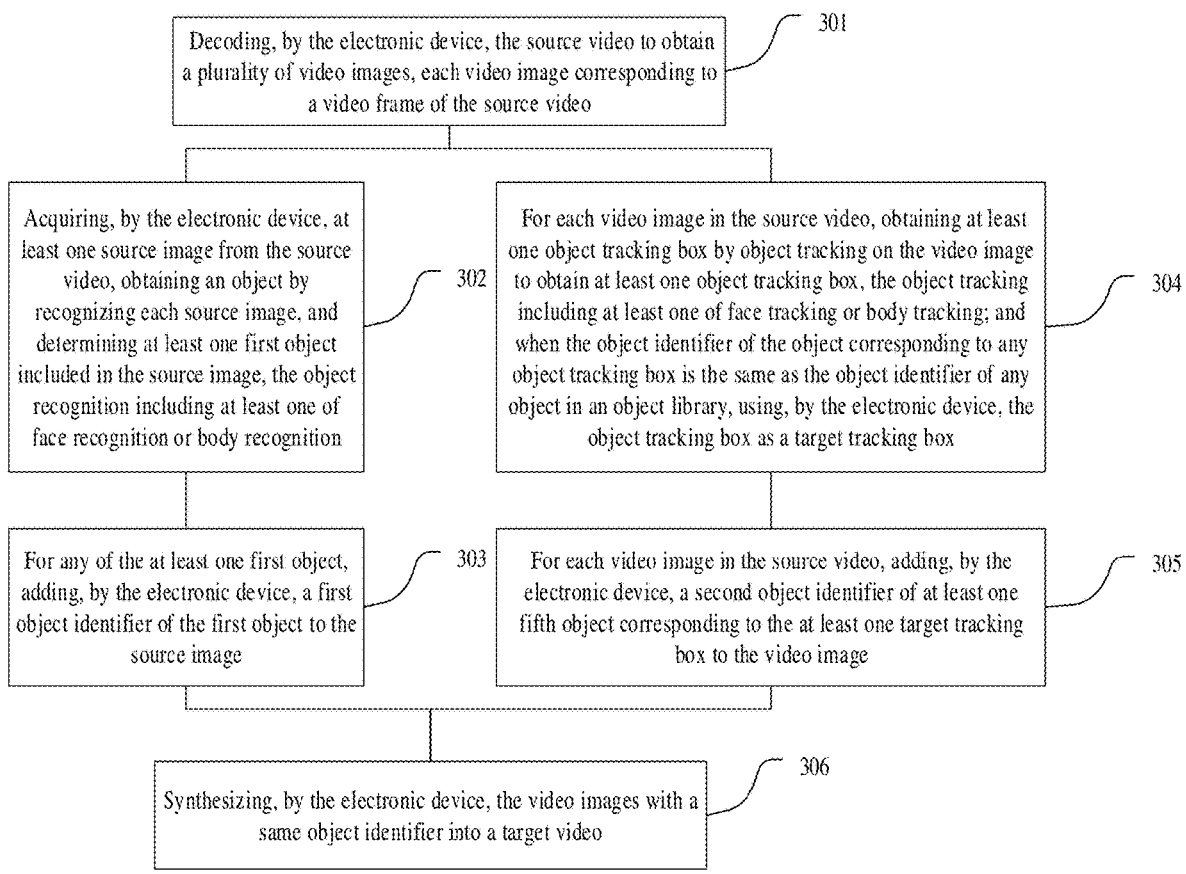
FIG. 3 is a flowchart of another method for processing video according to an embodiment of the present disclosure.

FIG. 3 is a flowchart of another video processing method according to an embodiment of the present disclosure. As shown in FIG. 3, the method includes the following contents.

In 301, the electronic device decodes the source video to obtain a plurality of video images, and each of the plurality of the video image corresponds to a video frame of the source video.

In some embodiments, optionally, the source video is a video just shot by the user, or a video taken by the user in a historical time, or other videos obtained by the user. The video source is not specifically limited by the embodiment of the present disclosure. The electronic device may decode the source video, and extract a plurality of video frames from the source video, and each of the plurality of the video frame is a video image, thereby obtaining a plurality of video images.

It should be noted that the video may be affected by the environment or the device during shooting, and a camera shakes, resulting in shaking of the shot video picture, which is not conducive to object detection and tracking. Therefore, before the electronic device acquires the at least one source image from the source video, video image stabilization processing may be performed on the source video. The manner of video image stabilization is specifically limited by the embodiment of the present disclosure.

In 302, the electronic device acquires at least one source image from the source video, performs object recognition on each source image, and determines at least one first object included in the source image, wherein the object recognition includes at least one of face recognition or body recognition.

In some embodiments, the electronic device obtains at least one source image from the source video, the source image is recognized, and at least one first object is obtained, wherein the first object includes at least one of the face area or the body area.

In some embodiments, when object recognition is performed on at least one object included in the source video, the electronic device may perform object recognition on each of the plurality of video images obtained above. At this point, the plurality of video images are at least one source image obtained by a terminal from the source video. The electronic device may also obtain one video image from the above plurality of video images at intervals of a preset number of frames, thereby obtaining at least one source image. That is, the electronic device acquires part or all of the plurality of video images as the at least one source image. The preset number of frames may be 5 frames, 10 frames, and the like, which is not specifically limited in the embodiment of the present disclosure.

In some embodiments, the case that the electronic device acquires one source image at intervals of a preset number of frames is taken as an example for description. The electronic device may perform object recognition on each source image. The object recognition includes at least one of the face recognition or body recognition.

In some embodiments, a similarity between the first object and a reference object in a database is greater than a similarity threshold. The database includes at least one of a face database or a body database, and the reference object includes at least one of a face image or a body image.

In some embodiments, when the object recognition is face recognition, the first object only includes the face area, the electronic device performs object recognition on each source image. The operation of determining at least one first object included in the source image may be that for each source image in the source video, the electronic device may perform face recognition on the source image to obtain at least one second object, and for each of the at least one second object, when a similarity between a face of the second object and a face in the face database is greater than a first similarity threshold, the electronic device may determine the second object as the first object. When the electronic device performs face recognition, the face of the object in the source video may be firstly detected to obtain at least one face image, and face key point detection and correction is performed on the at least one face image. Face features are extracted from the corrected face images and face images stored in the face database respectively by a face verification network. The electronic device may calculate the similarity between the extracted face features. The above face verification network may be obtained by training based on a convolutional neural network.

In some embodiments, when the object recognition is body recognition, the first object only includes the body area, and the electronic device performs object recognition on each source image. The operation of determining at least one first object included in the source image may be that for each source image in the source video, the electronic device may perform body recognition on the source image to obtain at least one third object, and for each of the at least one third object, when a similarity between a body of the third object and a body in the body database is greater than a second similarity threshold, the electronic device may determine the third object as the first object. When the electronic device performs body recognition, the body of the object may be detected firstly from the source video to obtain at least one body image, human body posture and partial matching are performed on the at least one body image, and then body features are extracted respectively. The electronic device may calculate the similarity between the extracted body features.

In some embodiments, when the object recognition is both the face recognition and body recognition, the first object includes both the face area and the body area, and the electronic device performs object recognition on each source image. The operation of determining at least one first object included in the source image may be that for each source image in the source video, the electronic device may perform face recognition and body recognition on the source image to obtain at least one fourth object, and for each of the at least one fourth object, when a similarity between a face of the fourth object and a face in the face database is greater than the first similarity threshold, and a similarity between a body and a body in the body database is greater than the second similarity threshold, the electronic device may determine the fourth object as the above first object.

In some embodiments, before the electronic device performs object recognition on each source image in the source video to determine the at least one first object included in the source image, whether the object recognition is continuously performed is determined according to at least one of the face or body detected results.

In some embodiments, the electronic device detects the source image; and in response to a ratio of the detected object in the source image being greater than a ratio threshold, the source image is recognized.

In some embodiments, the electronic device performs face detection on the source image, and when the detected face is a front face and the ratio of the face in the source image is greater than a first ratio threshold, the electronic device performs face recognition on the source image. Or the electronic device performs body detection on the source image, and when the detected body is upright and the ratio of the body in the source image is greater than a second ratio threshold, the electronic device performs body recognition on the source image. Or, the electronic device performs face detection and body detection on the source image, when the detected face is the front face and the ratio of the face in the source image is greater than the first ratio threshold, and when the detected body is upright and the ratio of the body in the source image is greater than the second ratio threshold, the electronic device performs face recognition and body recognition on the source image. Before the object recognition is performed, whether the subsequent object recognition is continuously performed is determined according to the detection result of at least one of the face detection or body detection.

In some embodiments, when the electronic device performs face recognition and body recognition on the source image at the same time, a face detection box and a body detection box of the same object may have overlapping parts, and the electronic device may determine whether the face detection box and the body detection box with the overlapping parts belong to the same object according to the size of the overlapping part. When belonging to the same object, the electronic device may set the same object identifier for the face detection box and the body detection box. When not belonging to the same object, the electronic device may set the object identifiers for the face detection box and the body detection box respectively to distinguish different objects.

In some embodiments, the operation of face recognition and body recognition on the source image by the electronic device may be that for the face detection box and body detection box with overlapping parts, the electronic device may determine an intersection-union ratio of the face detection box and the body detection box. When the intersection-union ratio is greater than a target ratio threshold, it is determined that the face detection box and the body detection box belong to the same fourth object, and the electronic device may set the same object identifier for the face detection box and the body detection box. When the intersection-union ratio is not greater than the target ratio threshold, it is determined that the face detection box and the body detection box do not belong to the same fourth object, and the electronic device sets the object identifier for the face detection box. The reason is that when the intersection-union ratio is less than the target ratio threshold, it can be considered that a confidence of the body detection box is lower, while a confidence of the face detection box is higher, that is, the body detection result is not credible. Therefore, the terminal only sets the object identifier for the face detection box. For the face detection box without overlapping, the electronic device may set the object identifier for the face detection box. For the body detection box without overlapping, the electronic device may set the object identifier for the body detection box. The intersection-union ratio, i.e., intersection over union (IOU), is configured to reflect an overlapping degree of the two detection boxes, and may be represented by the ratio of an intersection set to a union set between the two detection boxes with overlapping parts.

In the case that the first object includes both the face area and the body area, then for the face area and the body area with overlapping parts, the electronic device sets the object identifier for the face area and the body area based on the intersection-union ratio of the face area and the body area, wherein the intersection-union ratio is the ratio of the intersection set and the union set between the two areas with overlapping parts. Optionally, in response to the intersection-union ratio being greater than the target ratio threshold, the electronic device sets the same object identifier for the face area and the body area. In response to the intersection-union ratio being not greater than the target ratio threshold, the electronic device sets the object identifier for the face area.

It should be noted that when the object is a person, since the head of the person is at the upper part of the body, when the electronic device determines whether a human face detection box and a human body detection box belong to the same person, the condition that the human face detection box is at the upper position of the human body detection box needs to be met while the intersection-union ratio is greater than the target ratio threshold, then the electronic device can determine that the human face detection box and the human body detection box belong to the same person.

In some embodiments, the user may provide the image including a target object, and the electronic device may extract features from the face of the target object, and store the face information of the target object in the face database. The electronic device may also extract features from the body of the target object, and store the body information of the target object in the body database. At this point, when object recognition on each source image, the electronic device only needs to determine whether the target object is included in the source image, that is, the target object is the above first object. There may be one or more target objects.

In some embodiments, in the case that the user does not provide the image including the target object, the electronic device may perform object recognition on each source image. When the electronic device recognizes a new object by means of face recognition, the face information of the new object may be stored in the face database. Or, when the electronic device recognizes the new object by means of body recognition, the body information of the new object may be stored in the body database. Or when the electronic device recognizes the new object by means of face recognition and body recognition at the same time, the face information of the new object may be stored in the face database, and the body information of the new object may be stored in the body database. When the electronic device recognizes an object that has been stored in the face database or the body database, the electronic device may record an object identifier of the object. The object identifier may be a number, an identity document (ID) which is a unique code), a name, or the like. The new object refers to an object that is not stored in the face database or the body database.

The electronic device updates the first object to the database in response to the similarity between the first object and the reference object in the database being less than or equal to the similarity threshold.

It should be noted that the electronic device may realize the face recognition of the object by any face recognition algorithm, and may also realize the body recognition of the object by any body recognition algorithm, which is not specifically limited by the embodiment of the present disclosure. For example, a face recognition algorithm is configured to recognize the human face, and a human body recognition algorithm is configured to recognize the human body.

In 303, for any of the at least one first object, the electronic device adds a first object identifier of the first object to the source image.

Since the first object identifier is also an object identifier essentially, the above 303 also means that for any of the at least one first object, the electronic device adds the object identifier of the first object to the source image.

In some embodiments, for any source image, the electronic device may add the object identifier of each of the at least one first object determined in the source image to the source image.

In some embodiments, in the case that the user provides an image including the target object, that is, the user has provided with the target object, then the first object determined by the electronic device is the target object. In the case that the target object is included in the source image, then the electronic device may add the object identifier of the target object to the source image. In the case that the target object is not included in the source image, then the electronic device does not acquire the first object, and there is no need to add the object identifier to the source image.

In some embodiments, in the case that the user has not provided with the target object, when there is only one object in the source image, the electronic device may use the object as the first object and add the object identifier of the first object to the source image. When there are a plurality of objects in the source image, the electronic device may use the plurality of objects as the first objects, and add the object identifiers of the plurality of first objects to the source image.

In 304, for each video image in the source video, the electronic device performs object tracking on the video image to obtain at least one object tracking box. The object tracking includes at least one of face tracking or body tracking. When the object identifier of the object corresponding to any object tracking box is the same as the object identifier of any object in an object library, the electronic device uses the object tracking box as the target tracking box.

Since the at least one source image is part or all of the video images of the source video, a possible implementation of generating the target video based on the source images with the same object identifier is provided.

In the case that the source images are all video images, then the source images with the same object identifier may be directly filtered, which is equivalent to filtering each video image with the same object identifier, thereby generating the target video.

In the case that the source images are part of the video images, for example the video images selected at intervals of a preset number of frames, then after the object identifier of the first object is added to the source image, the first object in the video image between two adjacent source images may be tracked to obtain the object tracking box in the video image. Therefore, there is no need to recognize each frame of the video image. The recognition only needs to be performed at intervals of the preset number of frames, and for the rest of the video images, the recognized first object is directly tracked.

In some embodiments, the electronic device may perform the following operations: object tracking on the source image to obtain at least one object tracking box, wherein the object tracking includes at least one of face tracking or body tracking; when the object identifier of the object corresponding to any object tracking box is the same as the object identifier of any object in the object library, the object tracking box is used as the target tracking box. That is, the electronic device determines the target tracking box in the source image based on the object tracking technology. The source image may be any one or more frames of video images in the source video.

For any first object, the electronic device adds the object tracking box to the video image of the source video based on the first object, wherein the object tracking box is obtained based on tracking the first object. The object identifier of the first object is added to the video image.

In some embodiments, the electronic device may perform object tracking on at least one object included in the source video. The electronic device may track the object in combination with the object recognition. When the electronic device detects the new object, the electronic device may track the new object based on the detection box of the new object. When starting to track the new object, the electronic device may use the detection box of the new object and the video image to perform tracking initialization to predict the position of the object in the next frame, that is, the position where the object may appear in the next video image. The electronic device may identify the position of the object in the next video image by the tracking box.

In some embodiments, in the case that the user has provided with the target object, the object identifier of the target object is stored in the object library, and the electronic device may only track the target object. When the object is tracked in the video image, the electronic device obtains the position information of at least one object tracking box, and the electronic device may compare the object identifier of the object corresponding to each object tracking box with the object identifier of the target object stored in the object library. When the object identifier of any object is the same as the object identifier of the target object, it means that the object tracked by the object tracking box is the target object, and the electronic device may use the object tracking box as the target tracking box. There may be one or more target objects.

In some embodiments, in the case that the user has not provided with the target object, the electronic device may track all objects detected in the source video. For each video image, the electronic device may acquire at least one object tracking box, and the electronic device may directly use the at least one object tracking box as the target tracking box. It should be noted that when the electronic device detects a new object in the video image, the electronic device may set an object identifier for the new object and track the new object.

In some embodiments, when a face of the new object is detected, the electronic device may predict the possible position of the face of the new object in the next video image based on the face detection box, and the position is represented by the face tracking box in the next video image.

In some embodiments, when a body of the new object is detected, the electronic device may predict the possible position of the body of the new object in the next video image according to the body detection box, and the position is represented by the body tracking box in the next video image.

It should be noted that when an intersection-union ratio of the face detection box and the body detection box of the new object is greater than the target ratio threshold, the object identifiers corresponding to the face tracking box and the body tracking box of the new object are the same object identifier.

In some embodiments, the electronic device obtains a target tag by recognizing the object tracking box. The target tag includes at least one of an expression tag or an action tag. A synthetic element corresponding to the target tag is acquired, wherein the synthetic element includes at least one of an audio element, a video element, a picture element or a special effect element. An element identifier of the synthetic element is added to the video image.

In some embodiments, when the electronic device performs object tracking on an object in any video image to obtain at least one target tracking box, the electronic device may perform expression recognition on the at least one target tracking box to obtain at least one expression tag. The electronic device may acquire at least one first synthetic element according to a correspondence relationship between the expression tag and the first synthetic element. The first synthetic element may include at least one of an audio element, a video element, a picture element, or a special effect element. The electronic device may add the element identifier of the first synthetic element to the video image, and the adding operation is an example illustration of adding the element identifier of the first synthetic element to the source image by the electronic device.

In some embodiments, when the electronic device performs object tracking on an object in any video image to obtain at least one target tracking box, the electronic device may perform action recognition on the at least one target tracking box to obtain at least one action tag. The electronic device may acquire at least one second synthetic element according to a correspondence relationship between the action tag and the second synthetic element, wherein the second synthetic element may include at least one of an audio element, a video element, a picture element, or a special effect element. The electronic device may add the element identifier of the second synthetic element to the video image, and the adding operation is an example illustration of adding the element identifier of the second synthetic element to the source image by the electronic device.

It should be noted that since the target tracking algorithm has a confidence output, when the confidence of any object is less than a target confidence, the electronic device fails to track the object. When the electronic device determines the failure of tracking any object, the electronic device may determine a third object identifier of the object, and may cache each video image that appears afterwards from the video image failed to track. When the electronic device detects the third object identifier again, it means that the object reappears, and the electronic device may stop caching the video images, and determine a cache quantity of the cached video image. When the cache quantity is less than a cache quantity threshold, it means that the object still exists in the cached video image, and the electronic device may add the third object identifier to the cached video image. When the cache quantity is not less than the cache quantity threshold, it means that the object may not appear in the cached video image, and the electronic device may clear the above cached video image.

In response to the failure of tracking the first object, the electronic device starts to cache the video image until the first object is detected again, and the cache quantity of the video image is determined. In response to the cache quantity being less than the cache quantity threshold, the object identifier of the first object is added to the cached video image. In response to the cache quantity being not less than the cache quantity threshold, the above cached video image is cleared.

It should be noted that, since the tracking algorithm may have a certain error, the electronic device may correct the tracking box according to the object detection boxes generated during object recognition every preset number of frames. That is, when the electronic device performs object recognition, the object in the current video image may be recognized by the detection box. When the coincidence degree of the detection box and the tracking box of any object is less than the target coincidence threshold, it means that the tracking box has a larger tracking error, and the electronic device may initialize the tracking box of the object according to the detection box and the video image.

In 305, for each video image in the source video, the electronic device adds a second object identifier of at least one fifth object corresponding to the at least one target tracking box to the video image.

In some embodiments, the electronic device adds the object tracking box to the video image of the source video based on the first object, and adds the object identifier of the first object to the video image.

In some embodiments, for each video image in the source video, the electronic device may add the second object identifier to the video image according to the at least one target tracking box determined above. When the user has provided with a target object, the electronic device may determine at least one fifth object corresponding to the at least one target tracking box, wherein the at least one fifth object is the at least one target object provided by the user. When the user has not provided with the target object, the electronic device may determine at least one fifth object corresponding to the above at least one target tracking box, wherein the at least one fifth object is all the objects included in the video image.

In 306, the electronic device synthesizes the video images with the same object identifier into a target video.

In some embodiments, the electronic device generates the target video based on the source images with the same object identifier.

In some embodiments, the electronic device may distinguish the plurality of video images in the above source video according to the object identifiers, each of the object identifiers corresponds to at least one video image, and each video image also corresponds to at least one object identifier. That is, one object may appear in one or more video images, and one video image may include one or more objects. The electronic device may synthesize the video images with the same object identifier into a target video in a chronological order.

In some embodiments, the electronic device may also add the synthetic element when synthesizing the target video. Correspondingly, the operation of synthesizing the video images with the same object identifier into the target video by the electronic device may be that the electronic device acquires at least one video image with the same object identifier, and according to the element identifier corresponding to each video image, at least one of the first synthetic element or the second synthetic element is added to the video image. The electronic device may sort the at least one video image subjected to the adding processing in a chronological order, and synthesize the target video. The electronic device may encode the above at least one video image to realize the synthesis of the video image to obtain a complete video.

In some embodiments, the electronic device acquires the video image with the same object identifier, and adds the synthetic element corresponding to the element identifier to the video image according to the element identifier of the video image. The video images subjected to the adding processing are sorted in a chronological order and synthesized into the target video.

It should be noted that the above method are possible implementations exemplarily shown in the embodiment of the present disclosure. It is possible for those skilled in the art to make various amendments and changes to the method. For example, 302 and 304 may be performed at the same time. In some embodiments, the electronic device may perform 302 and 303 at first, and then perform 304 and 305, which is not specifically limited by the embodiment of the present disclosure.

Figure 4:
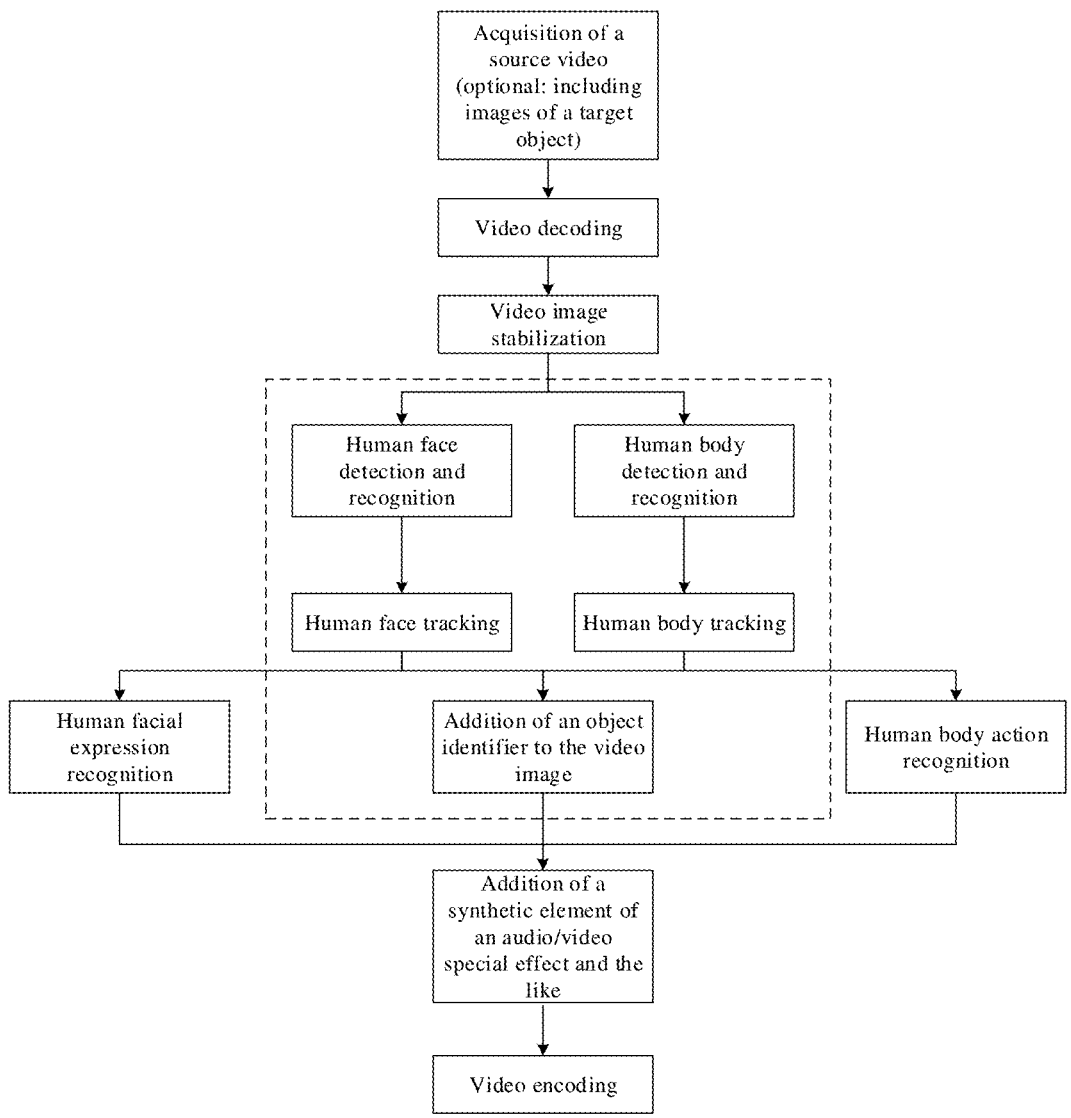
FIG. 4 is a flowchart of another method for processing video according to an embodiment of the present disclosure.

FIG. 4 is a flowchart of another video processing method according to an embodiment of the present disclosure. By taking a person as an example of the object, FIG. 4 shows the main flow of video processing by the electronic device, which includes: acquisition of the source video (optional: including the images of the target object), video decoding, video image stabilization, human face detection and recognition, human body detection and recognition, human face tracking, human body tracking, addition of the object identifier to the video image, human facial expression recognition, human body action recognition, addition of the synthetic element of the audio/video special effect and the like, and video encoding.

Figure 5:
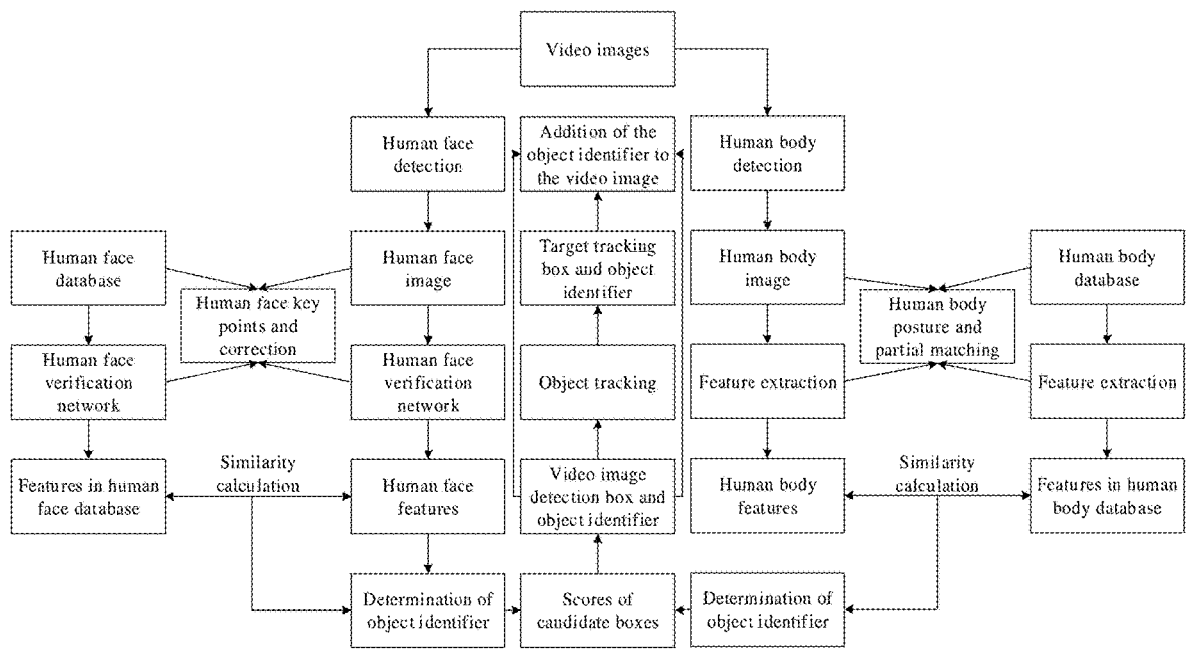
FIG. 5 is a schematic diagram of a human body recognition and tracking process according to an embodiment of the present disclosure.

FIG. 5 is a schematic diagram of a human body recognition and tracking process according to an embodiment of the present disclosure. By taking the person as an example of the object, FIG. 5 shows the human face recognition and tracking process by the electronic device, which includes: human face detection, human face images, inputting of human face key points and corrected images into a human face verification network, matching of the human face features with the features in the human face database, similarity calculation, determination of the object identifier of the object corresponding to the human face according to the similarity, optional determination of the box with the highest scores from candidate boxes as the human face detection box, addition of the object identifier to the video image according to the current video image detection box and the object identifier of each object, and human face tracking of at least one object according to the human face detection box. The recognition and tracking process of the human body by the electronic device includes: human body detection, human body images, extraction of human body features by posture and partial matching, matching of the human body features with the features in the human body database, similarity calculation, determination of the object identifier of the object corresponding to the human body according to the similarity, optional determination of the box with the highest scores from candidate boxes as the human body detection box, addition of the object identifier to the video image according to the current video image detection box and the object identifier of each object, and human body tracking for at least one object according to the human body detection box.

According to the technical solution according to the present disclosure, the video images in the source video can be automatically resynthesized into a separate video according to different objects, and the accuracy and efficiency of video processing are high.

Figure 6:
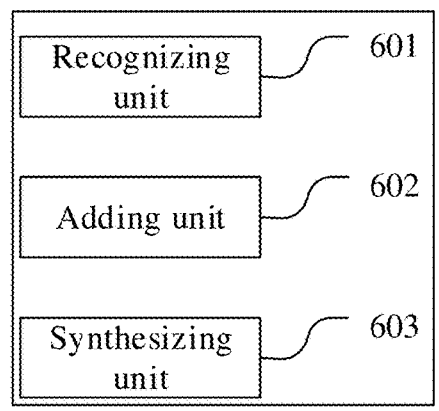
FIG. 6 is a block diagram of a video processing apparatus according to an embodiment of the present disclosure.

FIG. 6 is a block diagram of a video processing apparatus according to an embodiment of the present disclosure. As shown in FIG. 6, the video processing apparatus includes: a recognizing unit 601, an adding unit 602, and a synthesizing unit 603.

The recognizing unit 601 is configured to acquire at least one source image from a source video, perform object recognition on each of the source image, and determine at least one first object included in the source image, wherein the object recognition includes at least one of face recognition or body recognition.

In some embodiments, the recognizing unit 601 is configured to acquire at least one source image from the source video, and obtain at least one first object by recognizing the source image to, wherein the first object includes at least one of a face area or a body area.

The adding unit 602 is configured to add a first object identifier of the first object to the source image for any one of the at least one first object.

In some embodiments, the adding unit 602 is configured to add the object identifier of the first object to the source image for any of the at least one first object.

The synthesizing unit 603 is configured to synthesize the video images with a same object identifier into a target video.

In some embodiments, the synthesizing unit 603 is configured to generate a target video based on the source images with the same object identifier.

In some embodiments, a similarity between the first object and a reference object in a database is greater than a similarity threshold, wherein the database includes at least one of a face database or a body database, and the reference object includes at least one of a face image or a body image.

In some embodiments, the recognizing unit 601 is further configured to implement the following.

For each source image in the source video, face recognition is performed on the source image to obtain at least one second object. For each of the at least one second object, when a similarity between a face of the second object and a face in the face database is greater than a first similarity threshold, the second object is determined as the first object. Or, for each source image in the source video, body recognition is performed on the source image to obtain at least one third object, for each of the at least one third object, when a similarity between a body of the third object and a body in the body database is greater than a second similarity threshold, the third object is determined as the first object. Or, for each source image in the source video, the face recognition and body recognition are performed on the source image to obtain at least one fourth object, for each of the at least one fourth object, when a similarity between a face of the fourth object and a face in the face database is greater than the first similarity threshold, and a similarity between a body of the fourth object and a body in the body database is greater than the second similarity threshold, the fourth object is determined as the first object.

In some embodiments, the apparatus further includes:

a detecting unit, configured to perform face detection on the source image, and perform face recognition on the source image when the detected face is a front face and a ratio of the face in the source image is greater than a first ratio threshold; or a detecting unit, further configured to perform body detection on the source image, and perform body recognition on the source image when the detected body is upright and a ratio of the body in the source image is greater than a second ratio threshold; or a detecting unit, further configured to perform face detection and body detection on the source image, and perform the face recognition and body recognition on the source image when the detected face is a front face, and the ratio of the face in the source image is greater than the first ratio threshold, and when the detected body is upright and the ratio of the body in the source image is greater than the second ratio threshold.

In some embodiments, the detecting unit is configured to detect the source image; and in response to a ratio of the detected object in the source image being greater than the ratio threshold, recognize the source image.

In some embodiments, the recognizing unit 601 is further configured to determine an intersection-union ratio of a face detection box and a body detection box for the face detection box and the body detection box with overlapping parts. When the intersection-union ratio is greater than a target ratio threshold, it is determined that the face detection box and the body detection box belong to the same fourth object, and the same object identifier is set for the face detection box and the body detection box. When the intersection-union ratio is not greater than the target ratio threshold, it is determined that the face detection box and the body detection box do not belong to the same fourth object, and the object identifier is set for the face detection box, wherein the intersection-union ratio is a ratio of an intersection set to a union set between the two detection boxes with overlapping parts. For the face detection box without overlapping, the object identifier is set for the face detection box. For the body detection box without overlapping, the object identifier is set for the body detection box.

In some embodiments, in the case that the first object includes the face area and the body area, the recognizing unit 601 is further configured to: set, for the face area and the body area with overlapping parts, an object identifier for the face area and the body area based on the intersection-union ratio of the face area and the body area, wherein the intersection-union ratio is the ratio of the intersection set to the union set between the two areas with overlapping parts.

In some embodiments, the recognizing unit 601 is further configured to: set a same object identifier for the face area and the body area in response to the intersection-union ratio being greater than the target ratio threshold; and set an object identifier for the face area in response to the intersection-union ratio being not greater than the target ratio threshold.

In some embodiments, the apparatus further includes:
a storing unit, configured to store face information of a new object in the face database when the new object is recognized by the face recognition; or
a storing unit, further configured to store body information of the new object in the body database when the new object is recognized by the body recognition; or,
a storing unit, further configured to store the face information of the new object in the face database, and store the body information of the new object in the body database when the new object is recognized by both the face recognition and body recognition.

In some embodiments, the storing unit is configured to update the first object to the database in response to a similarity between the first object and a reference object being less than or equal to the similarity threshold.

In some embodiments, the apparatus further includes: a tracking unit, configured to obtain at least one object tracking box by object tracking on the video image for each video image in the source video, wherein the object tracking includes at least one of face tracking or body tracking.

The tracking unit is further configured to use the object tracking box as the target tracking box when the object identifier of the object corresponding to any object tracking box is the same as the object identifier of any object in an object library.

In some embodiments, the tracking unit is configured to add the object tracking box to the video image of the source video based on the first object, wherein the object tracking box is obtained based on tracking the first object.

The adding unit 602 is further configured to add a second object identifier of at least one fifth object corresponding to the at least one target tracking box to the video image.

In some embodiments, the adding unit 602 is further configured to add the object identifier of the first object in the video image.

In some embodiments, the apparatus further includes: a caching unit, configured to determine a third object identifier of the object when it is determined that the tracking of any object fails, and start to cache the video images.

The caching unit is further configured to stop caching the video images when the third object identifier is detected again, and determine a cache quantity of the cached video image.

In some embodiments, the caching unit is configured to: in response to the failure of tracking the first object, start caching the video images until the first object is detected again, and determine the cache quantity of the video image.

The adding unit 602 is further configured to add a third object identifier to the cached video image when the cache quantity is less than a cache quantity threshold.

In some embodiments, the adding unit 602 is further configured to add the object identifier of the first object to the cached video image in response to the cache quantity being less than the cache quantity threshold.

In some embodiments, the apparatus further includes: a clearing unit, configured to clear the cached video image when the cache quantity is not less than the cache quantity threshold.

In some embodiments, the recognizing unit 601 is further configured to obtain at least one expression tag by expression recognition on at least one target tracking box;
the apparatus further includes: an acquiring unit, configured to acquire at least one first synthetic element according to a correspondence relationship between an expression tag and a first synthetic element, wherein the first synthetic element includes at least one of an audio element, a video element, a picture element, or a special effect element; and
the adding unit 602 is further configured to add an element identifier of the first synthetic element to the video image.

In some embodiments, the recognizing unit 601 is further configured to obtain at least one action tag by action recognition on at least one target tracking box;
the apparatus further includes: an acquiring unit is further configured to acquire at least one second synthetic element according to a correspondence relationship between an action tag and a second synthetic element, wherein the second synthetic element includes at least one of an audio element, a video element, a picture element, or a special effect element;
and the adding unit 602, further configured to add the element identifier of the second synthetic element to the video image.

In some embodiments, the recognizing unit 601 is further configured to: obtain a target tag by recognizing the object tracking box, wherein the target tag includes at least one of the expression tag or the action tag.

The acquiring unit is further configured to: acquire a synthetic element corresponding to the target tag, wherein the synthetic element includes at least one of an audio element, a video element, a picture element, or a special effect element.

The adding unit 602 is further configured to: add the element identifier of the synthetic element to the video image.

In some embodiments, the synthesizing unit 603 is further configured to acquire at least one video image with the same object identifier, and add at least one of the first synthetic element or the second synthetic element to the video image according to the element identifier corresponding to each video image element; and sort the at least one video image subjected to adding processing in a chronological order, and synthesize a target video.

In some embodiments, the synthesizing unit 603 is also configured to acquire the video images with the same object identifier; add the synthetic elements to the video images according to the element identifiers of the video images; and sort the video images subjected to adding processing in a chronological order and synthesize the video images into the target video.

According to the technical solution according to the present disclosure, the video images in the source video can be automatically resynthesized into a separate video according to different objects, and the accuracy and efficiency of video processing are high.

Figure 7:
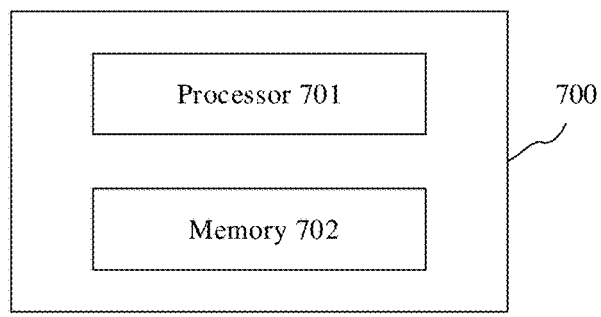
FIG. 7 is a structural block diagram of an electronic device according to an embodiment of the present disclosure.

FIG. 7 is a structural block diagram of an electronic device according to an embodiment of the present disclosure. The electronic device 700 may have relatively large differences due to different configurations or performances, and may include one or more central processing units (CPU) 701 and one or more memories 702. At least one program including at least one instruction is stored in the memory 702. The at least one program, when loaded and run by the processor 701, causes the processor 701 to perform the video processing method according to the above respective method embodiments. The electronic device may also be provided with components such as a wired or wireless network interface, a keyboard and an input and output interface for input and output. The electronic device may also include other components for implementing device functions, which is not repeated herein.

In some embodiments, the at least one program, when loaded and run by the processor, causes the processor to execute instructions for:
acquiring at least one source image from a source video;
obtaining at least one first object by recognizing the source image, wherein the first object includes at least one of a face area or a body area;
adding, for any of the at least one first object, an object identifier of the first object to the source image; and
generating a target video based on the source image with a same object identifier.

In some embodiments, a similarity between the first object and a reference object in a database is greater than a similarity threshold, wherein the database includes at least one of a face database or a body database, and the reference object includes at least one of a face image or a body image.

In some embodiments, the at least one program, when loaded and run by the processor, causes the processor to execute an instruction for:
updating the first object to the database in response to the similarity between the first object and the reference object being less than or equal to the similarity threshold.

In some embodiments, the at least one program, when loaded and run by the processor, causes the processor to execute instructions for:
detecting the source image; and
recognizing the source image in response to a ratio of the detected object in the source image being greater than a ratio threshold.

In some embodiments, in the case that the first object includes the face area and the body area, the at least one program, when loaded and run by the processor, causes the processor to execute an instruction for:
setting, for the face area and the body area with overlapping parts, an object identifier for the face area and the body area based on an intersection-union ratio of the face area and the body area, wherein the intersection-union ratio is a ratio of an intersection set to a union set between the two areas with the overlapping parts.

In some embodiments, the at least one program, when loaded and run by the processor, causes the processor to execute instructions for:
setting a same object identifier for the face area and the body area in response to the intersection-union ratio being greater than a target ratio threshold; and
setting an object identifier for the face area in response to the intersection-union ratio being not greater than the target ratio threshold.

In some embodiments, the at least one program, when loaded and run by the processor, causes the processor to execute instructions for:
adding an object tracking box to a video image of the source video based on the first object, wherein the object tracking box is obtained based on tracking the first object; and
adding the object identifier of the first object to the video image.

In some embodiments, the at least one program, when loaded and run by the processor, causes the processor to execute instructions for:
starting to cache the video image in response to the failure of tracking the first object, until the first object is detected again, and determining a cache quantity of the video image; and
adding the object identifier of the first object to the cached video image in response to the cache quantity being less than a cache quantity threshold.

In some embodiments, the at least one program, when loaded and run by the processor, causes the processor to execute instructions for:
obtaining a target tag by recognizing the object tracking box, wherein the target tag includes at least one of an expression tag or an action tag;
acquiring a synthetic element corresponding to the target tag, wherein the synthetic element includes at least one of an audio element, a video element, a picture element, or a special effect element; and
adding an element identifier of the synthetic element to the video image.

In some embodiments, the at least one program, when loaded and run by the processor, causes the processor to execute instructions for:
acquiring the video images with the same object identifier;
adding the synthetic elements to the video images according to the element identifiers of the video images; and
sorting the video images subjected to adding processing in a chronological order and synthesizing the video images into the target video.

An embodiment of the present disclosure also provides a storage medium for a server. The storage medium stores at least one program including at least one instruction. The at least one program, when loaded and run by a processor, causes the processor to perform the method for processing videos according to the above embodiment.

In some embodiments, the at least one program, when loaded and run by the processor, causes the processor to execute instructions for:

acquiring at least one source image from a source video;

obtaining at least one first object by recognizing the source image, wherein the first object includes at least one of a face area or a body area;

adding, for any of the at least one first object, an object identifier of the first object to the source image; and generating a target video based on the source image with the same object identifier.

In some embodiments, a similarity between the first object and a reference object in a database is greater than a similarity threshold, wherein the database includes at least one of a face database or a body database, and the reference object includes at least one of a face image or a body image.

In some embodiments, the at least one program, when loaded and run by the processor, enables the processor to execute an instruction for:

updating the first object to the database in response to the similarity between the first object and the reference object being less than or equal to the similarity threshold.

In some embodiments, the at least one program, when loaded and run by the processor, enables the processor to execute an instruction for:

detecting the source image; and recognizing the source image in response to a ratio of the detected object in the source image being greater than a ratio threshold.

In some embodiments, in the case that the first object includes the face area and the body area, the at least one program, when loaded and run by the processor, enables the processor to execute instructions for:

setting, for the face area and the body area with overlapping parts, an object identifier for the face area and the body area based on an intersection-union ratio of the face area and the body area, wherein the intersection-union ratio is a ratio of an intersection set to a union set between the two areas with the overlapping parts.

In some embodiments, the at least one program, when loaded and run by the processor, enables the processor to execute instructions for:

setting a same object identifier for the face area and the body area in response to the intersection-union ratio being greater than a target ratio threshold; and setting an object identifier for the face area in response to the intersection-union ratio being not greater than the target ratio threshold.

In some embodiments, the at least one program, when loaded and run by the processor, enables the processor to execute instructions for:

adding an object tracking box to the video image of the source video based on the first object, wherein the object tracking box is obtained based on tracking the first object; and adding the object identifier of the first object to the video image.

In some embodiments, the at least one program, when loaded and run by the processor, enables the processor to execute instructions for:

starting to cache the video image in response to the failure of tracking the first object, until the first object is detected again, and determining a cache quantity of the video image; and adding the object identifier of the first object to the cached video image in response to the cache quantity being less than a cache quantity threshold.

In some embodiments, the at least one program, when loaded and run by the processor, enables the processor to execute instructions for:

obtaining a target tag by recognizing the object tracking box, wherein the target tag includes at least one of an expression tag or an action tag;

acquiring a synthetic element corresponding to the target tag, wherein the synthetic element includes at least one of an audio element, a video element, a picture element, or a special effect element; and adding an element identifier of the synthetic element to the video image.

In some embodiments, the at least one program, when loaded and run by the processor, enables the processor to execute instructions for:

acquiring the video images with the same object identifier;

adding the synthetic elements to the video images according to the element identifiers of the video images; and sorting the video images subjected to adding processing in a chronological order and synthesizing the video images into the target video.

An example embodiment provides a computer program product including at least one instruction. The at least one instruction, when executed by a processor of an electronic device, causes the electronic device to perform the method for processing videos according to the above respective embodiments.

Other embodiments of the present disclosure will be apparent to those skilled in the art from consideration of the description and practice of the present disclosure. The present disclosure is intended to cover any variations, uses, or adaptations of the present disclosure following the general principles thereof and including common knowledge or commonly used technical measures which are not disclosed herein. The description and embodiments are to be considered as examples only, with a true scope and spirit of the present disclosure is indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for processing videos, comprising:
acquiring at least one source image from a source video;
obtaining at least one first object by recognizing the at least one source image, wherein the first object comprises at least one of a face area or a body area;
initializing an object tracking box according to a detection box and the source image, in response to a coincidence degree of the detection box and the object tracking box of the at least one first object being less than a target coincidence threshold, wherein the detection box is configured to identify the first object in the source image during object recognition, and the object tracking box is configured to track the first object;
adding an object identifier of the first object to the at least one source image; and
generating a target video based on the at least one source image with a same object identifier.

2. The method according to claim 1, wherein a similarity between the first object and a reference object in a database is greater than a similarity threshold, wherein the database comprises at least one of a face database or a body database, and the reference object comprises at least one of a face image or a body image.

3. The method according to claim 2, further comprising:
updating the first object into the database in response to the similarity between the first object and the reference object being less than or equal to the similarity threshold.

4. The method according to claim 2, further comprising:
detecting the at least one source image; and
recognizing the at least one source image in response to a ratio of the detected object in the source image being greater than a ratio threshold.

5. The method according to claim 2, wherein said adding the object identifier of the first object to the at least one source image comprises:
setting, for the face area and the body area with overlapping parts, an object identifier for the face area and the body area based on an intersection-union ratio of the face area and the body area, wherein the intersection-union ratio comprises a ratio of an intersection set to a union set between the two areas with the overlapping parts.

6. The method according to claim 5, wherein said setting the object identifier for the face area and the body area comprises:
setting a same object identifier for the face area and the body area in response to the intersection-union ratio being greater than a target ratio threshold; and
setting an object identifier for the face area in response to the intersection-union ratio being not greater than the target ratio threshold.

7. The method according to claim 1, further comprising:
adding an object tracking box to a video image of the source video based on the first object, wherein the object tracking box is obtained based on tracking the first object; and
adding the object identifier of the first object to the video image.

8. The method according to claim 7, further comprising:
caching the video image in response to a failure of tracking the first object;
determining a cache quantity of the video image in response to the first object being detected again; and
adding the object identifier of the first object to the cached video image in response to the cache quantity being less than a cache quantity threshold.

9. The method according to claim 7, further comprising:
obtaining a target tag by recognizing the object tracking box, wherein the target tag comprises at least one of an expression tag or an action tag;
acquiring a synthetic element corresponding to the target tag, wherein the synthetic element comprises at least one of an audio element, a video element, a picture element, or a special effect element; and
adding an element identifier of the synthetic element to the video image.

10. The method according to claim 9, wherein said generating the target video comprises:
acquiring video images with the same object identifier;
adding the synthetic element to the video images according to the element identifiers of the video images; and
sorting the video images subjected to adding processing in a chronological order and synthesizing the video images into the target video.

11. An electronic device, comprising:
a processor; and
a memory for storing at least one program comprising at least one instruction executable by the processor;
wherein the at least one instruction, when executed by the processor, causes the processor to perform a method comprising:
acquiring at least one source image from a source video;
obtaining at least one first object by recognizing the at least one source image, wherein the first object comprises at least one of a face area or a body area;
initializing an object tracking box according to a detection box and the source image, in response to a coincidence degree of the detection box and the object tracking box of the at least one first object being less than a target coincidence threshold, wherein the detection box is configured to identify the first object in the source image during object recognition, and the object tracking box is configured to track the first object;
adding an object identifier of the first object to the at least one source image; and
generating a target video based on the at least one source image with a same object identifier.

12. The electronic device according to claim 11, wherein a similarity between the first object and a reference object in a database is greater than a similarity threshold, wherein the database comprises at least one of a face database or a body database, and the reference object comprises at least one of a face image or a body image.

13. The electronic device according to claim 12, wherein the method further comprises:
updating the first object into the database in response to the similarity between the first object and the reference object being less than or equal to the similarity threshold.

14. The electronic device according to claim 12, wherein the method further comprises:
detecting the at least one source image; and
recognizing the at least one source image in response to a ratio of the detected object in the at least one source image being greater than a ratio threshold.

15. The electronic device according to claim 12, wherein said adding the object identifier of the first object to the at least one source image comprises:
setting, for the face area and the body area with overlapping parts, an object identifier for the face area and the body area based on an intersection-union ratio of the face area and the body area, wherein the intersection-union ratio comprises a ratio of an intersection set to a union set between the two areas with the overlapping parts.

16. The electronic device according to claim 15, wherein said setting the object identifier for the face area and the body area comprises:
setting a same object identifier for the face area and the body area in response to the intersection-union ratio being greater than a target ratio threshold; and
setting an object identifier for the face area in response to the intersection-union ratio being not greater than the target ratio threshold.

17. The electronic device according to claim 11, wherein the method further comprises:

adding an object tracking box to a video image of the source video based on the first object, wherein the object tracking box is obtained based on tracking the first object; and adding the object identifier of the first object to the video image.

18. The electronic device according to claim 17, wherein the method further comprises:

caching the video image in response to a failure of tracking the first object;

determining a cache quantity of the video image in response to the first object being detected again; and adding the object identifier of the first object to the cached video image in response to the cache quantity being less than a cache quantity threshold.

19. The electronic device according to claim 17, wherein the method further comprises:

obtaining a target tag by recognizing the object tracking box, wherein the target tag comprises at least one of an expression tag or an action tag;

acquiring a synthetic element corresponding to the target tag, wherein the synthetic element comprises at least one of an audio element, a video element, a picture element, or a special effect element; and adding an element identifier of the synthetic element to the video image.

20. A non-transitory storage medium storing at least one program comprising at least one instruction, wherein the at least one instruction, when executed by a processor of an electronic device, causes the electronic device to perform a method comprising:

acquiring at least one source image from a source video;

obtaining at least one first object by recognizing the at least one source image, wherein the first object comprises at least one of a face area or a body area;

initializing an object tracking box according to a detection box and the source image, in response to a coincidence degree of the detection box and the object tracking box of the at least one first object being less than a target coincidence threshold, wherein the detection box is configured to identify the first object in the source image during object recognition, and the object tracking box is configured to track the first object;

adding an object identifier of the first object to the at least one source image; and generating a target video based on the at least one source image with a same object identifier.

* * * * *